(12) United States Patent
Erhardt et al.

(10) Patent No.: US 6,909,595 B2
(45) Date of Patent: Jun. 21, 2005

(54) CAPACITOR WINDING AND A CAPACITOR HAVING THE CAPACITOR WINDING

(75) Inventors: Werner Erhardt, Ballendorf (DE); Bernd Staib, Syrgenstein (DE)

(73) Assignee: EPCOS AG, München (DE)

( * ) Notice: Subject to any disclaimer, the term of this patent is extended or adjusted under 35 U.S.C. 154(b) by 82 days.

(21) Appl. No.: 10/344,353

(22) PCT Filed: Jul. 25, 2001

(86) PCT No.: PCT/DE01/02810

§ 371 (c)(1),
(2), (4) Date: Feb. 11, 2003

(87) PCT Pub. No.: WO02/15207

PCT Pub. Date: Feb. 21, 2002

(65) Prior Publication Data

US 2004/0022007 A1 Feb. 5, 2004

(30) Foreign Application Priority Data

Aug. 11, 2000 (DE) .......................... 100 39 436

(51) Int. Cl.⁷ ............................. H01G 4/32; H01G 9/04
(52) U.S. Cl. ..................... 361/511; 361/301.5; 361/530
(58) Field of Search ................................. 361/502, 503, 361/508, 511, 512, 517, 528, 530, 301.5

(56) References Cited

U.S. PATENT DOCUMENTS 4,488,203 A * 12/1984 Muranaka et al. .......... 361/502
4,603,373 A * 7/1986 Lavene ..................... 361/306.1
4,691,266 A    9/1987 Yoshio
4,896,249 A    1/1990 Endo et al.
5,034,849 A    7/1991 Vetter
5,115,378 A    5/1992 Tsuchiya et al.
5,150,283 A * 9/1992 Yoshida et al. ............. 361/502
5,403,454 A    4/1995 Taniguchi et al.
5,930,108 A    7/1999 Kurzweil et al.

FOREIGN PATENT DOCUMENTS

| DE | 1104614 | 11/1961 |
| DE | 26 46 491 | 4/1978 |
| DE | 30 03 089 | 8/1980 |
| DE | 36 07 225 | 9/1987 |
| DE | 691 12 443 | 3/1996 |
| DE | 197 04 584 | 2/1999 |
| EP | 0 388 689 | 9/1990 |
| EP | 0 449 145 | 10/1991 |

* cited by examiner

Primary Examiner—Eric Thomas
(74) Attorney, Agent, or Firm—Schiff Hardin LLP

(57) ABSTRACT

A capacitor winding for a capacitor has a layer stack that is limited by two end faces in a longitudinal direction and by one or more lateral surfaces that extend transverse to the longitudinal direction. The stack has electrode layers and parting layers proceeding in the longitudinal direction, and has a single-ply sheath of an electrically insulating material that covers the lateral surfaces of the layer stack gap-free and that has a projecting section at an end face. The sheath can be especially advantageously implemented as a heat shrinkable tube or hose that protects the capacitor winding against damage upon insertion into a housing of the capacitor.

8 Claims, 2 Drawing Sheets

CAPACITOR WINDING AND A CAPACITOR HAVING THE CAPACITOR WINDING

BACKGROUND OF THE INVENTION

The invention is directed to a capacitor winding having a layer stack that is limited by two end faces in a longitudinal direction and by one or more lateral surfaces transverse to the longitudinal direction and that comprises electrode layers and parting layers proceeding in the longitudinal direction. The invention is also directed to a capacitor having the capacitor winding.

Capacitor windings of the species initially cited are known that comprise the shape of a cuboid and wherein the parting layers are saturated with a liquid. These capacitor windings are usually installed in aluminum housings. For the electrical insulation of the capacitor winding relative to the housing and in order to prevent the fluid from running out of the capacitor winding, the known capacitor windings are covered with plate-like insulating elements at each lateral surface. These plate-shaped insulating elements are additionally wound with a multi-ply binding.

The known capacitor windings have the disadvantage that there is not adequate tightness at the abutting edges of the insulating plates, so that fluid can emerge from the capacitor winding. Although the binder-shaped wrapping of the insulating plates sees to it that a compact package is produced from the layer stack and the insulating plates, this arrangement cannot prevent the occurrence of tracking currents between a plurality of capacitor windings installed next to one another in a housing.

Since the capacitor windings are usually installed in a cup-shaped housing by means of insertion, they also have the disadvantage that the layers of the layer stack are inadequately protected against damage at their end faces during the insertion. The individual layers of the layer stack can therefore be slightly damaged upon installation in the housing.

SUMMARY OF THE INVENTION

An object of the present invention is therefore to specify a capacitor winding that is protected against damage upon insertion into a housing.

The object is achieved by a capacitor winding that comprises a layer stack. The layer stack is limited by two end faces in a longitudinal direction and by one or more lateral surfaces extending transverse to the longitudinal direction. The layer stack also comprises electrode layers and parting layers proceeding in the longitudinal direction. The capacitor winding is also provided with a single-ply sheath of electrically insulating material that covers the lateral surfaces of the layer stack gap-free and that has a projecting section at an end face.

The inventive capacitor winding has the advantage that an effective protection of the edge of the layer stack upon insertion into a cup-shaped housing is realized by means of the section of the sheath projecting at an end face. However, it must thereby be noted that the layer stack is inserted into the housing with the end face comprising the projecting section of the sheath in front.

The capacitor winding also has the advantage that the single-ply sheath seals the layer stack in an especially space-saving way. The gap-free covering of the lateral surfaces of the layer stack sees to an especially good electrical insulation of the layer stack.

The projecting section of the sheath can, for example, be fashioned collar-shaped and thereby extend in longitudinal direction of the layer stack. Such a projecting section can form a funnel or conical end that is the leading part upon insertion of the layer stack into a cup-shaped housing in order to protect the lateral edges of the corresponding end face against damage due to the edges of the housing.

It is also especially advantageous when the projecting section of the sheath is folded over toward the inside and thereby covers an edge region of the end face. In this case, the edges of the layer stack can be protected against damage upon insertion into the capacitor housing without employing additional measures.

The sheath can be fashioned in an especially space-saving way in that it is under such a tensile stress that it conforms tightly to the surface of the layer stack. An especially compact capacitor winding that is correspondingly simple to handle is obtained as a result thereof.

For example, a sheath that resides under tensile stress and conforms tightly to the surface of the layer stack can be realized in the form of a heat shrinkable tube or hose. The application of the sheath to the layer stack thereby assumes an especially simple form since the shrinkable hose is pulled over the layer stack and subsequently shrunken on by being heated. For example, polyvinyl chloride (PVC) or polyester come into consideration as material for such a heat shrinkable hose. These materials can be shrunken on by heating the layer stack to 220 degrees Celsius in a through-type furnace.

It is also advantageous when the sheath comprises a thickness of 30 through 80 micrometers. Such a sheath has, on the one hand, adequate mechanical stability, so that it cannot be that easily damaged upon insertion of the capacitor winding into a cup-shaped housing. On the other hand, it is adequately thin in order to realize a good volume utilization and, thus, space saving for the capacitor winding.

Over and above this, a capacitor winding is especially advantageous wherein the electrode layers are carbon cloths saturated with an ion-containing liquid and the parting layers are electrically insulating intermediate layers that are transmissive for the ion of the liquid. Further, an electrode layer is covered with an electrically conductive contacting layer at one side and by a parting layer of a further electrode layer at the other side.

Such a double layer capacitor can be especially effectively protected against the emergence of the liquid by means of a sheath fashioned as the shrinkable hose or tube. Moreover, it is necessary in the capacitor that has just been described that a contact pressure exist between the electrode layers and the contacting layers. This contact pressure is usually realized by pressing the layer stack into a housing having corresponding dimensions. It is precisely in this case that there is an increased risk of damage to the layer stack at the end faces during insertion into the housing. The inventive sheath is therefore especially advantageous in this case.

The invention also specifies a capacitor having a capacitor winding that is inserted into a housing open toward one end face of the capacitor winding. The dimensions of the housing are thereby selected such that the layers of the capacitor winding are pressed flat at a wall of the housing. Since the walls of the housing usually comprise a sharp edge caused by the manufacture and since the capacitor winding must be inserted into the open housing under pressure (otherwise, the layers of the capacitor winding would not be pressed flat at a wall), the inventive sheath that protects the edges of the end face of the capacitor winding is especially advantageous in this case.

Further, a capacitor is especially advantageous wherein a plurality of capacitor windings are inserted side-by-side into the housing such that their layers are pressed flat against a wall of the housing.

In this case, the insulation of the capacitor windings from one another is also of particular significance. Such an insulation, particularly the prevention of tracking currents between the capacitor windings, can be realized especially well by the inventive sheath that covers the lateral surfaces of the layer stack gap-free.

The housing can be closed by one or more terminating elements in order to protect the capacitor against outside environmental influences.

The invention is explained in greater detail below on the basis of exemplary embodiments and the Figures.

DESCRIPTION OF THE PREFERRED EMBODIMENTS

Figure 1:
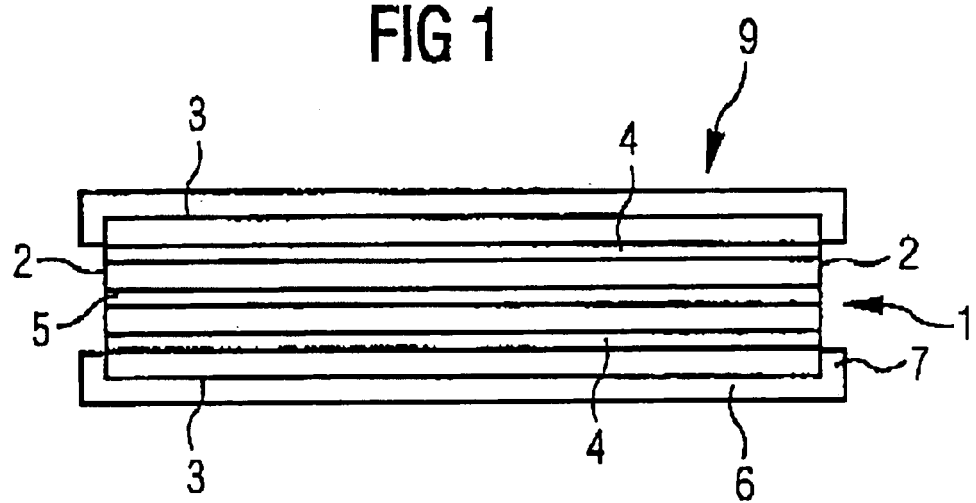
FIG. 1 is a schematic cross-sectional view of an inventive capacitor winding according to the present invention.

FIG. 1 shows a capacitor winding 9 having a layer stack 1 that comprises the shape of a cuboid with two end faces 2 and four lateral surfaces 3. The layer stack 1 comprises electrode layers 4 and parting layers 5 stacked on top of one another. The layer stack 1 is surrounded by a sheath 6 that comprises a projecting section 7 at both end faces 2 of the layer stack 1. Together with the sheath 6, the layer stack 1 forms the capacitor winding 9. The sheath 6 is fashioned as shrink hose or heat shrinkable tube that is shrunken onto the layer stack 1.

Figure 2:
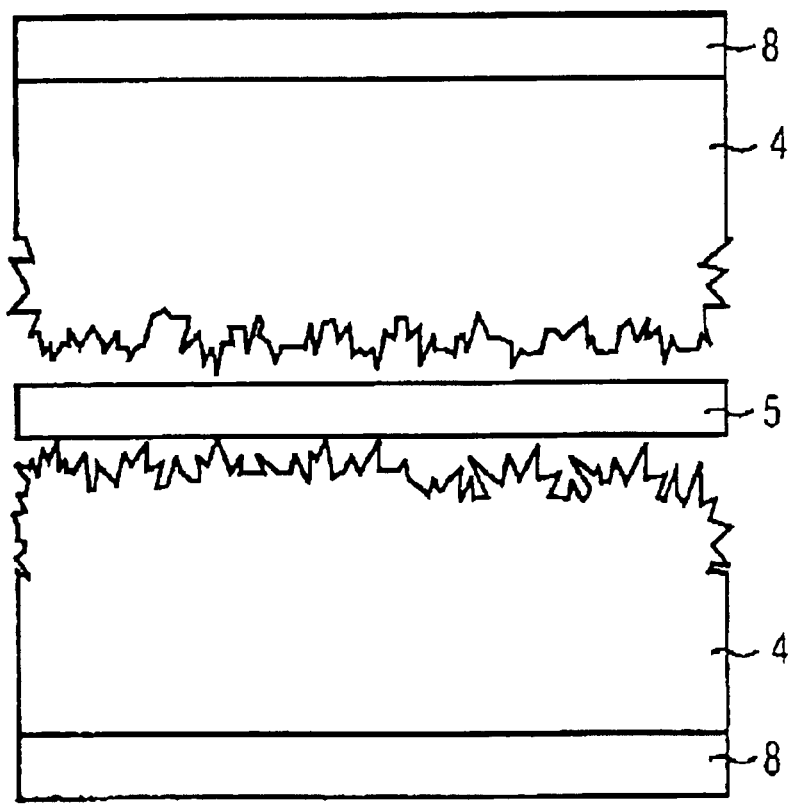
FIG. 2 is an enlarged cross-sectional view of a layer structure of a capacitor winding of FIG. 1.

FIG. 2 shows a possible layer structure for the layer stack of FIG. 1. Two electrode layers 4 are shown that are fashioned in the form of carbon cloths having a large surface at the sides facing toward one another. These carbon cloths are saturated with an ion-containing liquid. The electrode layers 4 are separated from one another by a parting layer 5. This parting layer 5 is an electrically insulating layer that, however, is transmissive for the ions of the liquid. This parting layer 5 can, for example, be a paper or, also, a polypropylene film.

The two electrode layers 4 are contacted by a contacting layer 8 at their sides facing away from one another. This contacting layer can be composed of, for example, aluminum. In order to assure a good electrical contact between the contacting layer 8 and the electrode layer 4, it is necessary that the contacting layer 8 be pressed onto the electrode layer 4.

Figure 3:
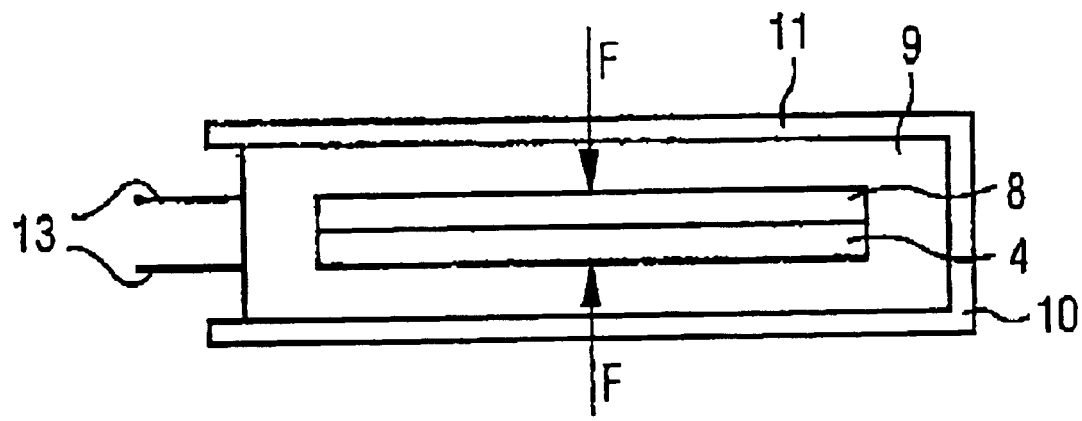
FIG. 3 is a schematic cross-sectional view of a capacitor with the inventive capacitor winding.

Such a pressure is achieved by a capacitor according to FIG. 3 wherein a capacitor winding having the layers described in FIG. 2, particularly an electrode layer 4 and a contacting layer 8, is installed in a cup-shaped housing 10. The dimensions of the housing 10, particularly the spacing between the walls 11, is selected such that the layers 8, 4 situated in the capacitor winding 9 are pressed onto one another with a force F.

Terminal elements 13 are conducted out of the housing 10 for contacting the capacitor winding 9. As a result of the inventive sheath (not shown in FIG. 3), the layer stack can also be inserted into the housing 10 under pressure in the direction of the force F without the edges of the end faces of the capacitor winding 9 being damaged.

Figure 4:
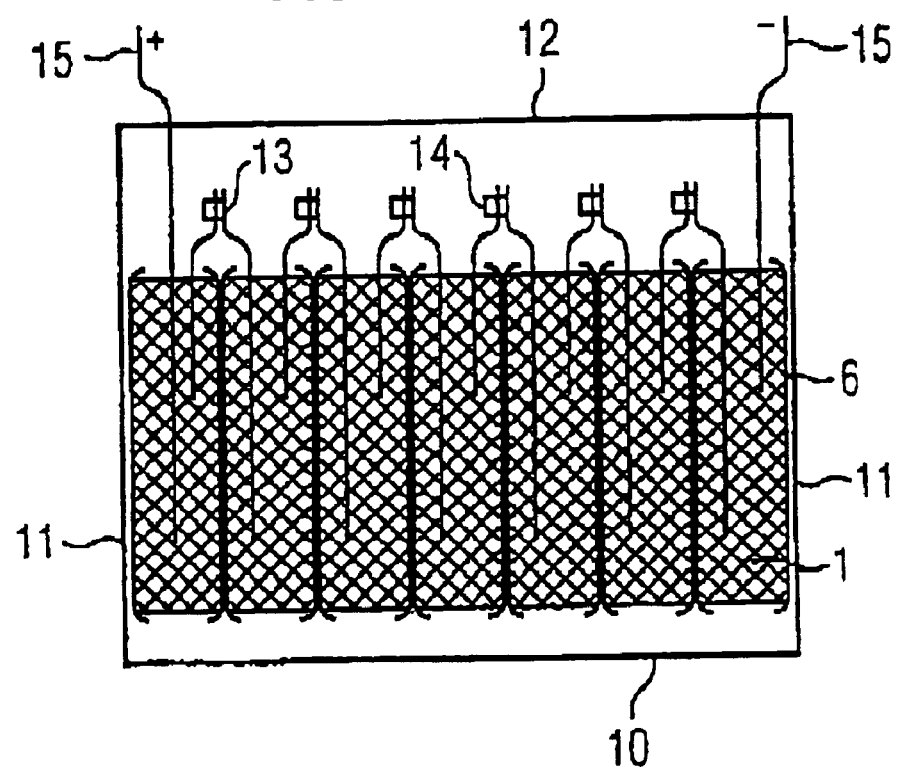
FIG. 4 is a schematic cross-sectional view of a capacitor having a plurality of inventive capacitor windings installed in a housing.

FIG. 4 shows a capacitor wherein a plurality of stacks 1 are installed in a housing 10 so that the individual layers are pressed against one another due to a corresponding spacing between the walls 11 of the housing 10. In this case, the inventive sheath 6 has the additional advantage that tracking currents between the individual layer stacks 1 can be effectively reduced.

The layer stacks 1 are provided with terminal elements 13 that are respectively connected such to terminals elements 13 of the neighboring layer stack 1 by means of connector elements 14 that an electrical series circuit of the layer stacks 1 occurs. The respectively outermost terminal element 13 is connected to an outside terminal 15 that is conducted through a terminating element 12 that closes the housing 10. The connector elements 14 can, for example, be solder points. What is achieved by the selection of the dimensions of the housing 10 is that the individual layers of the layer stack 1 are pressed onto one another by a force F.

The invention is not limited to the illustrated exemplary embodiments but is defined by the following patent claims.

We claim:

1. A capacitor having a housing open toward an end face, at least one capacitor winding having a layer stack of electrode layers and parting layers proceeding in a longitudinal direction, said stack having two end faces in a longitudinal direction and at least one lateral surface extending transverse to the longitudinal direction, a single-ply sheath of electrically insulating material covering the lateral surfaces of the layer stack gap-free and having a projecting section at an end face of the stack, said layer stack being pressed into said housing, said housing having dimension selected so that the layers of the capacitor lining are pressed flat by walls of the housing.

2. A capacitor according to claim 1, wherein the housing is closed by one or more terminal elements.

3. A capacitor according to claim 1, which has a plurality of capacitor windings inserted into the housing side-by-side with their layers being pressed flat by the walls of the housing.

4. A capacitor according to claim 3, wherein the housing is closed by one or more terminal elements.

5. A capacitor according to claim 1, wherein the sheath of each layer stack is under a tensile stress so that it conforms tightly to the surface of the layer stack.

6. A capacitor according to claim 5, wherein the sheath is formed by a heat shrinkable tube.

7. A capacitor according to claim 6, wherein the sheath has a thickness in a range of 30 $\mu$m to 80 $\mu$m.

8. A capacitor according to claim 6, wherein the electrode layers are carbon cloths saturated with an ion-containing liquid, the parting layers are electrically insulating intermediate layers which are transmissive for the ions of the liquid, each of the electrode layers being covered with an electrically conducting contacting layer on a side and are separated by the parting layer from further electrode layers at the other side.

* * * * *